US009352497B2

(12) United States Patent
Persico et al.

(10) Patent No.: US 9,352,497 B2
(45) Date of Patent: May 31, 2016

(54) MOULD FOR THE ROTATIONAL MOULDING OF PLASTIC MATERIALS

(71) Applicant: PERSICO S.p.A., Nembro (BG) (IT)

(72) Inventors: Claudia Persico, Albino (IT); Lorenzo Bergamo, Bergamo (IT)

(73) Assignee: PERSICO S.P.A., Nembro (BG) (IT)

( * ) Notice: Subject to any disclaimer, the term of this patent is extended or adjusted under 35 U.S.C. 154(b) by 0 days.

(21) Appl. No.: 14/751,642

(22) Filed: Jun. 26, 2015

(65) Prior Publication Data
US 2015/0375430 A1 Dec. 31, 2015

(30) Foreign Application Priority Data
Jun. 27, 2014 (IT) .............................. MI2014A1177

(51) Int. Cl.
| B29C 41/04 | (2006.01) |
| B29C 41/06 | (2006.01) |
| B29C 41/20 | (2006.01) |
| B29C 41/50 | (2006.01) |
| B29C 33/12 | (2006.01) |
| B29C 41/38 | (2006.01) |
| B29C 41/52 | (2006.01) |
| B29C 33/18 | (2006.01) |

(52) U.S. Cl.
CPC ................ *B29C 41/20* (2013.01); *B29C 33/12* (2013.01); *B29C 41/04* (2013.01); *B29C 41/042* (2013.01); *B29C 41/38* (2013.01); *B29C 41/50* (2013.01); *B29C 41/52* (2013.01); *B29C 33/18* (2013.01)

(58) Field of Classification Search
CPC ........ B29C 41/20; B29C 41/50; B29C 41/04; B29C 41/042; B29C 41/38; B29C 41/48
See application file for complete search history.

(56) References Cited

U.S. PATENT DOCUMENTS

| 3,192,568 A * | 7/1965 | Nicholls ................. B29C 41/20 249/111 |
| 3,652,368 A * | 3/1972 | Formo ..................... B29C 41/36 156/582 |
| 4,489,028 A * | 12/1984 | Masters .................. B29C 41/20 114/347 |
| 5,061,165 A | 10/1991 | Guzikowski |
| 5,705,110 A * | 1/1998 | Weber ..................... B29C 41/04 264/310 |
| 6,602,452 B2 * | 8/2003 | Schuessler ............. B29C 41/38 264/102 |
| 2002/0109251 A1 | 8/2002 | Sellepack |
| 2014/0272256 A1* | 9/2014 | Langheld ................ B29C 41/04 428/76 |

FOREIGN PATENT DOCUMENTS

| JP | H07167392 A | 7/1995 |
| WO | 8102994 A1 | 10/1981 |

* cited by examiner

*Primary Examiner* — Robert B Davis
(74) *Attorney, Agent, or Firm* — King & Schickli, PLLC

(57) ABSTRACT

A mold for the rotational molding of manufactured articles of plastic material includes two half-molds, one of which is provided, on its surface, with an insert-holding device comprising a rod with a first end passing through the wall of the half-mold at a respective passage channel and axially movable for projecting inside the mold. The mold also comprises a first pneumatic circuit able to apply a predetermined pressure, positive or negative, inside the mold. At least one insert-holding device is operatively connected to a second pneumatic circuit able to apply a predetermined pressure, positive or negative, and is internally provided with a plurality of means to apply the predetermined pressure at the passage channel, so that at the insert-holding device the same predetermined pressure value which generates inside the mold by the first pneumatic circuit is applied.

13 Claims, 4 Drawing Sheets

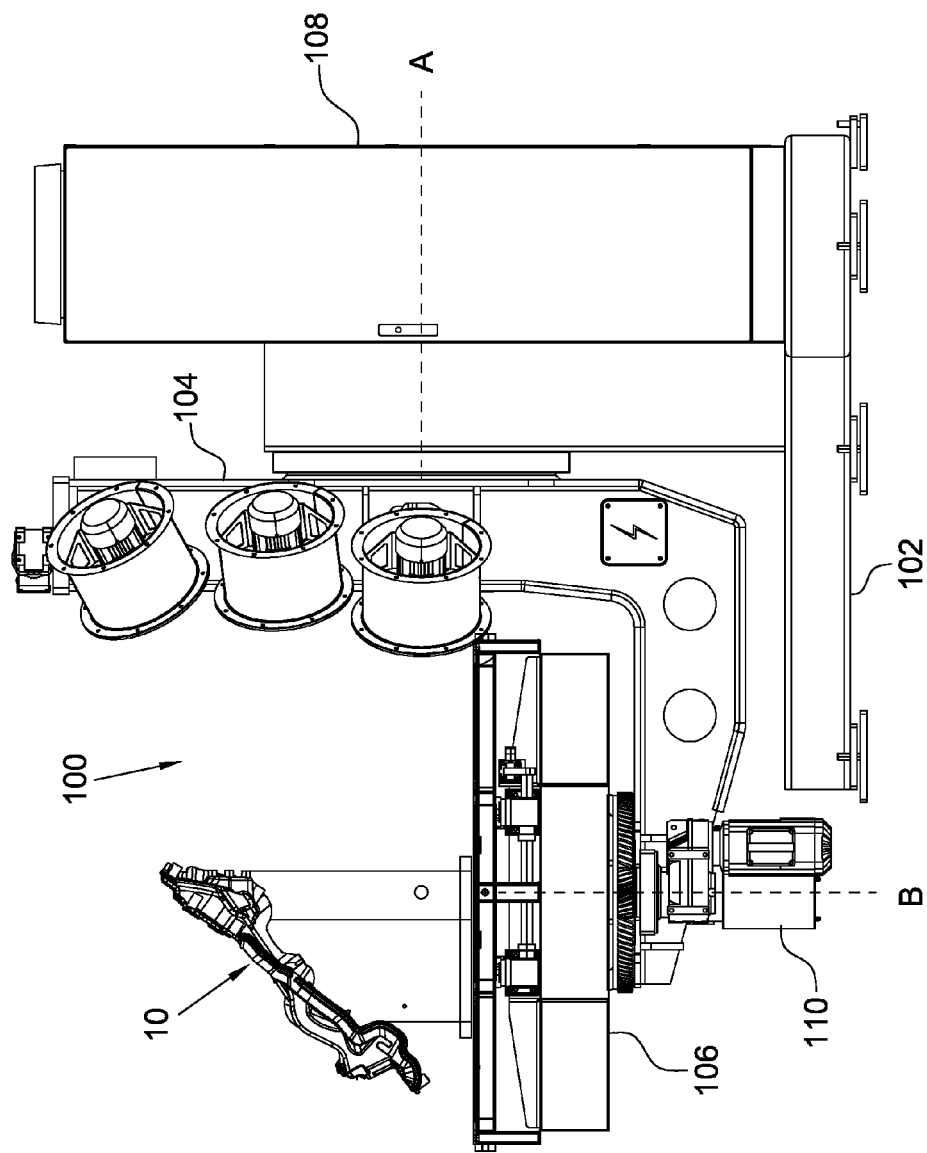

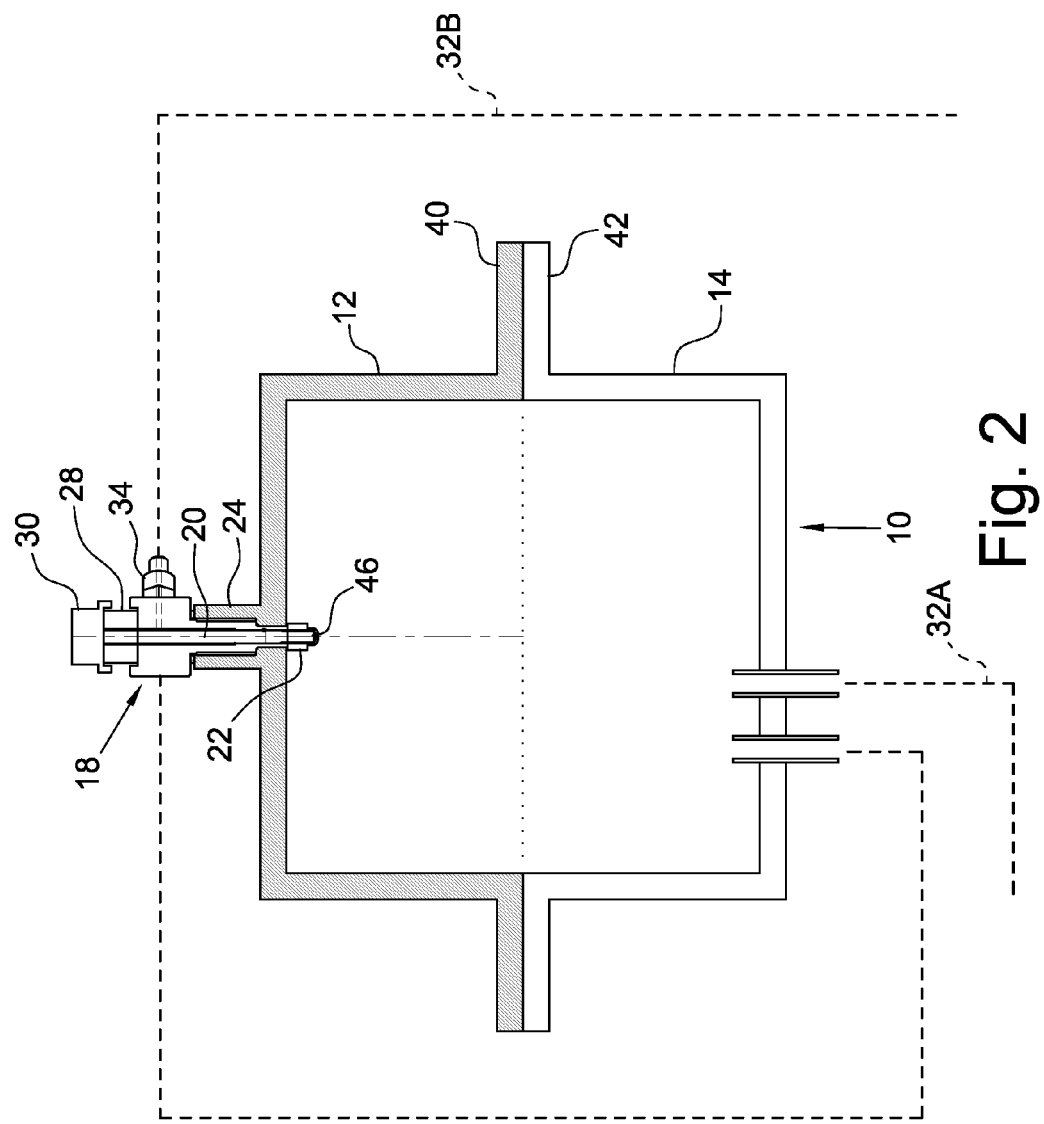

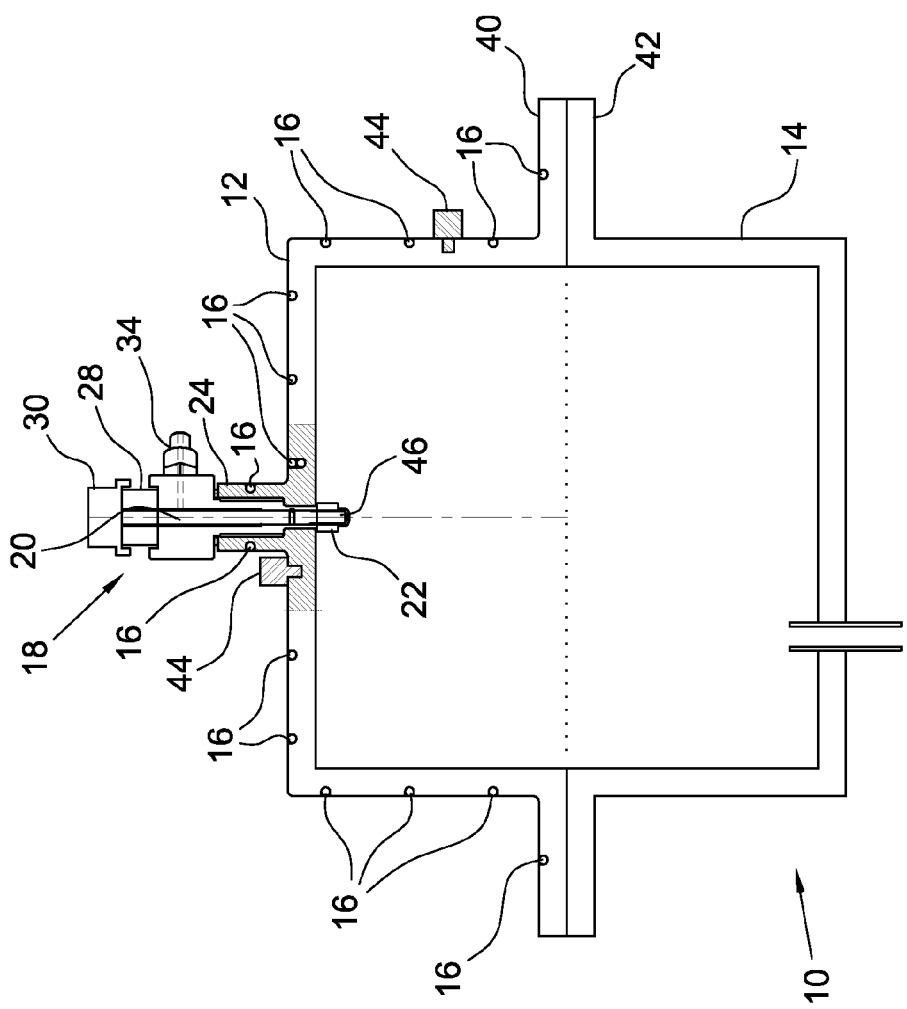

MOULD FOR THE ROTATIONAL MOULDING OF PLASTIC MATERIALS

FIELD OF THE INVENTION

The present invention refers in general to a mould for the rotational moulding of plastic materials and, more specifically, to a device for fixing inserts in a mould for the rotational moulding of plastic materials.

BACKGROUND OF THE INVENTION

As known, the moulding technology called "rotational" is dedicated to the production of hollow manufactured articles starting from various polymers. The rotational moulding technology provides the use of a specific mould in which a predetermined amount of liquid or powdered plastic is arranged. After the mould is closed, it is rotated about two perpendicular axes and heated, so that the hot material stratifies on the walls of the mould itself. Once the process has ended, the mould is cooled and, after reopening, the moulded piece or manufactured article is removed.

In many moulded pieces or manufactured articles there is the need to apply, during the moulding step, one or more inserts configured to face from the surface of the manufactured article itself. Generally, these inserts are manufactured with a different material (typically metal) from that of the moulded piece and must be perfectly coated with the polymer, as well as be firmly anchored to the moulded piece. An example of an insert can consist of a threaded component that allows the manufactured article to be fixed to other parts of the machinery in which such a manufactured article is intended to be inserted.

One of the conventional techniques for carrying out the co-moulding of the inserts consists of holding the insert against the inner surface of the mould by means of a mechanical fixing device, called insert-holder. The insert-holding device can be made, for example, in the form of a threaded pin that, once inserted through a through-hole of the mould, reaches the inner side of the mould itself and on which the insert is fixed, for example screwing it.

Again according to the prior art, the insert-holding device is usually provided with a system that allows the insert to slide inside the mould when, due to the shrinkage effect typical of the polymer during the solidification step, the manufactured article or piece being moulded tends to detach from the inner surface of the mould and to move away from the surface itself. In this way, the insert can move with the manufactured article, preventing it from "slipping out" during the moulding step. A system frequently used consists in making a bush at the base of the insert-holding device and in interposing a spring between the insert-holding device and the bush itself, so that the insert is held against the mould but can also move without too much effort, compressing the spring.

A typical drawback encountered in moulds provided with insert-holding devices is linked to the possible formation of the so-called "blowholes" around the co-moulded inserts. The blowholes are generated when a gas (air) passage is created through the polymeric material that is still in the molten state and that covers the insert or is close to the insert itself. This possible air passage creates cracking in the manufactured article and thus involves the need of discarding the manufactured article itself that must be remoulded, with an obvious waste of time and money.

This possible air passage is generated by a pressure difference between the inside and the outside of the mould. Such a pressure manages to "release" through the hole used to mount the insert-holding device. This possible air passage can also be due to the expansion of the air (as a result of the temperature change which the mould is subjected to during the rotational process) that remains trapped in some empty area created in the system for fixing the insert with the relative insert-holding device and/or the bush.

Another drawback encountered in moulds provided with insert-holding devices is linked to the scarcity of polymeric material that manages to "coat" the insert itself. In the rotational moulding the coating of the insert, as well of the entire mould, is linked to the temperature of the inner surface of the mould (and of the insert) that, when reaches the melting value of the polymer, starts holding the polymer that adheres thereto and melts. It is therefore important to ensure that the insert reaches such a temperature when inside the mould there is still sufficient polymer to be melted and, even better, that such a temperature is reached preferably earlier in the area of the insert with respect to the rest of the mould, so as to ensure the perfect coating of the insert itself. On the other hand, the area in which the insert is applied necessarily has a greater mass than that of the rest of the mould (due to the presence of the insert-holding device and of the relative bush) and, moreover, the insert itself typically has a reduced contact surface with respect to the mould, which receives a greater amount of heat from the hot air oven inside which it is arranged. Consequently, the insert-holding device is often penalised in receiving the heat irradiated by the oven.

In systems according to the prior art, the moulds for the rotational moulding are indeed introduced into hot air ovens and their heating takes place by convection. This classical solution makes it complex to manage the heating of the mould in a differentiated manner, for example favouring the heating of certain areas of the mould. Moreover, due to the high temperature of the oven (between 280° C. and 350° C.), it is also technically difficult to apply external elements to the mould that allow the temperature to be detected, as well as the application of circuits through which it is possible to manage and control the internal pressure of the mould.

In the rotational moulding technology it is known that advantages can be obtained, in certain steps of the transformation, either by applying a pressure inside the mould, or by creating a certain degree of vacuum. These provisions allow better compacting the polymeric material through the elimination, during sintering, of possible air bubbles that can form inside the material itself.

In the case in which action is taken on the pressure/vacuum inside the mould, it is however necessary to introduce technical solutions that avoid the possible defects that the pressure and/or vacuum can create. Indeed, at the communication points between the inside and the outside of the mould the pressure difference across the molten polymer leads to the cracking of the manufactured article, moving the material in such an area and generating a waste.

SUMMARY OF THE INVENTION

The purpose of the present invention is therefore to make a mould for the rotational moulding of plastic materials and, more specifically, a device for fixing the inserts in a mould for the rotational moulding of plastic materials, which is able to overcome the aforementioned drawbacks of the prior art in an extremely simple, cost-effective and particularly functional manner.

In detail, a purpose of the present invention is to make a mould for the rotational moulding of plastic materials that is able to avoid cracking in the manufactured article due to the formation of blowholes and to the application of pressure and/or vacuum.

Another purpose of the present invention is to make a mould for the rotational moulding of plastic materials that can be heated in a differentiated manner, creating independent temperature areas according to the needs.

These purposes according to the present invention are accomplished by making a mould for the rotational moulding of plastic materials and, more specifically, a device for fixing inserts in a mould for the rotational moulding of plastic materials, as outlined in claim 1.

Further characteristics of the invention are highlighted by the dependent claims, which are an integral part of the present description.

BRIEF DESCRIPTION OF THE DRAWING FIGURES

The characteristics and advantages of a mould for the rotational moulding of plastic materials according to the present invention will become clearer from the following description, given as a non-limiting example, referring to the attached schematic drawings, in which:

FIG. 1 is a schematic side elevation view of a generic machine for the rotational moulding on which a mould according to the present invention can be mounted;

FIG. 2 is a schematic view of an embodiment of the mould for the rotational moulding of plastic materials according to the present invention, provided with a respective device for fixing the inserts;

FIG. 3 is another schematic view of an embodiment of the mould for the rotational moulding of plastic materials according to the present invention, also provided with a respective device for fixing the inserts;

DETAILED DESCRIPTION OF THE INVENTION

Figure 5:
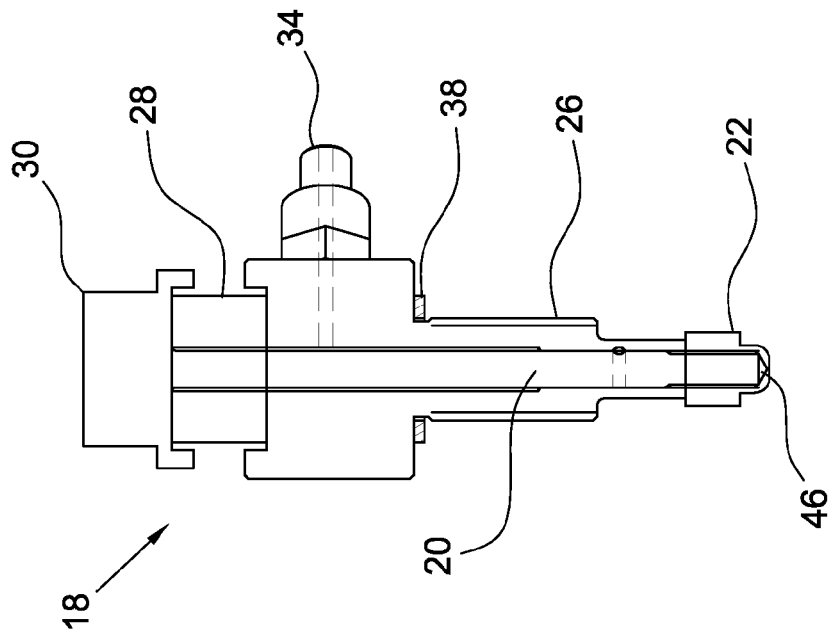
FIG. 5 is a transparent view of the device for fixing the inserts of FIG. 4.
Figure 4:
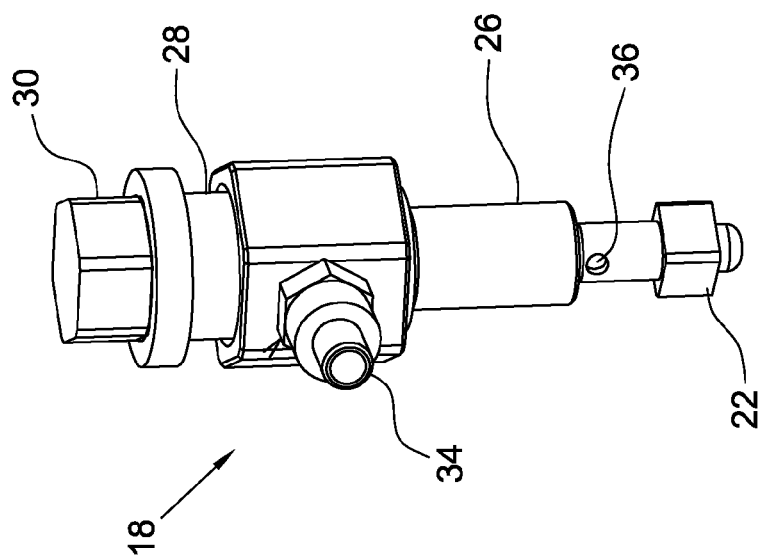
FIG. 4 is a perspective view of a device for fixing the inserts that can be applied to a mould according to the present invention.

With reference in particular to FIG. 1, a generic machine 100 for the rotational moulding is shown, on which a mould 10 according to the present invention can be mounted. The machine 100 is of the type comprising a base frame 102 that supports a first movable frame 104 that can rotate about a first motorized axis A, for example horizontal. Inside the first movable frame 104 a second movable frame 106 is supported that can rotate about a second motorized axis B, for example vertical, orthogonal to the first motorized axis A. On the second movable frame 106 the mould 10 is mounted, so that it can rotate about the motorized axes A and B. Respective motors 108 and 110 drive the rotation of the movable frames 104 and 106 about the two corresponding axes A and B.

Inside the second movable frame 106 the mould 10 is mounted (FIGS. 2 and 3), which comprises two half-moulds 12 and 14. At least one of the two half-moulds 12 and 14 is provided with one or more heating elements 16, like for example electrical resistances, for the stratification of the plastic material that is introduced into the two half-moulds 12 and 14 themselves during the production of the manufactured articles. With the application of heating elements 16 on the surface of the mould 10 it is possible to make a temperature control system that allows the mould 10 itself to be heated in a differentiated manner, creating independent areas with an autonomous heating circuit.

The temperature control system of the mould 10 can thus be made through:

application of one or more heating elements 16 in at least one predefined area of the mould 10;

application of one or more temperature measuring devices or probes 44 in the same predefined area of the mould 10;

making of an electric circuit configured for bringing the power supply to this predefined area of the mould 10, namely to the heating elements 16 applied there;

making of a temperature control system configured for adjusting the electric power supplied to the heating elements 16 based on the temperature measured by the probes 44 at such heating elements 16;

making of several areas of the mould 10 provided with the components described above and implementation of a temperature management unitary system in the various areas of the mould 10 allowing the differentiated setting, for each area, of the work temperature, of the electric power to be supplied and of a time sequence that allows these areas to be heated at differentiated times.

As shown in FIGS. 2 and 3, at least one of the two half-moulds 12 and 14 is provided, on its surface, with one or more devices 18 for fixing inserts to be embedded in the moulded manufactured article. Each device 18, called insert-holder, extends outside the respective half-mould 12 or 14 and comprises a rod 20 provided with a first end 46, preferably threaded, which passes through the wall of the half-mould 12 or 14 at a respective passage channel 24.

The rod 20 is axially movable in order to project inside the mould 10, so that on the respective first threaded end 46 it is possible to mount, by screwing, an insert 22 to be embedded in the moulded manufactured article. Outside the rod 20 an insert-holding bush 26 is coaxially mounted, which removably fixes the insert-holding device 18 on the outer wall of the respective half-mould 12 or 14.

The rod 20, with the respective first end 46, is held inside the body of the insert-holding device 18 by means of an elastic element 28 present in the body of the insert-holding device 18 itself. The rod 20 is rotatable about its own axis and is provided with a second handling end 30, opposite the first threaded end 46, which projects outside the half-mould 12 or 14. The second handling end 30 can be actuated in order to impart an axial rotation of the rod 20 and thus facilitate the screwing of an insert 22 on the opposite first end 46.

The mould 10 is provided, in a per se known way, with a first pneumatic circuit 32A capable of applying a predetermined pressure, positive or negative (vacuum), inside the mould 10 itself. According to the invention, at least part of the insert-holding devices 18 is operatively connected to a second pneumatic circuit 32B capable of applying a predetermined pressure, positive or negative (vacuum), and such insert-holding devices 18 are internally provided with a plurality of means configured to apply such a predetermined pressure at the passage channels 24 that put in communication the inside with the outside of the mould 10.

In this way, the second pneumatic circuit 32B is configured to apply, at one or more of the insert-holding devices 18 operatively connected to such a second pneumatic circuit 32B, the same predetermined pressure value (positive or negative) that is created inside the mould 10 by means of the first pneumatic circuit 32A. In other words, when a vacuum is created or a predetermined pressure is applied inside the mould 10, the same operative condition occurs simultaneously at the insert-holder devices 18 and therefore the polymer being processed is not stressed.

In detail, the insert-holding device 18 is provided with a fitting 34 for connecting with the second pneumatic circuit 32B, as well as with an inner duct system 36 in fluid connection with the fitting 34 and configured to blow compressed air and/or generate the vacuum at the passage channel 24. The insert-holding device 18 also comprises one or more sealing elements 38, like for example ring seals, configured for hydraulically insulating the inner duct system 36.

The second pneumatic circuit 32B that supplies the insert-holding devices 18 can be independent from the first pneumatic circuit 32A that supplies the mould 10. Alternatively, the second pneumatic circuit 32B that supplies the insert-holding devices 18 can also be made in series with the first pneumatic circuit 32A that supplies the mould 10. In this way, thanks to the natural load loss of the two circuits 32A and 32B arranged in series, a possible small pressure difference between the inside and the outside of the mould 10 generates a pressure differential that possibly stresses the polymer towards the outside of such a mould 10, with the consequence of making it impossible to generate the "sucking" of air towards the inside of the mould 10, but rather a light pushing of the polymer outwards. This phenomenon possibly leads to the creation of a slight "burr" (which does not generate waste) rather than a crack, which is, on contrary, an irremediable defect on the manufactured article.

Advantageously, the elastic element 28 of the insert-holding device 18 can consist of a gasket manufactured from a temperature-resistant elastomeric material. Such a gasket 28 is made with hardness and thickness calibrated so that the same gasket 28 can operate both as a spring, in order to compensate for the decrease in size of the manufactured article during solidification (shrinkage) and to allow the co-moulded insert 22 to move together with the manufactured article without being extracted therefrom or stressed by it, and as a sealing element for the vacuum (or the pressure).

Similar systems capable of applying a predetermined pressure, positive or negative (vacuum), which provide the making of a controlled-pressure chamber outside the mould 10 can be applied at all connection points between the inside of the mould 10 and the outer environment, like for example at the respective closing flanges 40 and 42 of the two half-moulds 12 and 14.

With reference to FIG. 3, it is highlighted how the temperature control system of the mould 10 can be applied locally at at least one of the insert-holding devices 18. For example, the passage channel 24 and/or the corresponding insert-holding device 18 inserted in it can be provided with one or more heating elements 16. In this way a heating area is made that is dedicated to the corresponding insert-holding device 18 and it is thus possible to control the temperature profile of this area in a different way during moulding. For example, it is possible to make the insert-holding devices 18 heat before and/or more than the rest of the mould 10 when there is still enough material in the mould 10 to adhere mostly in the areas adjacent to the insert-holding devices 18 rather than in the left parts of inner surface of the mould 10.

The same temperature control system can moreover be adopted in all areas of the mould 10 that, for various reasons, are usually disadvantaged during moulding, like for example due to the shape or position of the areas themselves with respect to the rest of the mould 10. The typical case can be that of a given area of the mould 10, like for example a cavity, which is difficult for the material (powdered polymer) loaded into the mould 10 itself to reach. Also in this case it is very effective to ensure that the area or the cavity heats before the rest of the mould 10 and even reaches higher work temperatures to be able to attract more material inside it.

The heating elements 16 applied to the passage channels 24 and/or to the insert-holding devices 18, for example, can consist of one or more heater bands, of one or more cartridge heaters or of one or more flexible heaters wound around the insert-holding device 18 or the relative base portion, namely the portion engaged in the corresponding passage channel 24 of the half-mould 12 or 14. All these solutions allow heating the area around the insert-holding device 18 and the corresponding passage channel 24 to a greater extent, or in any case heating such an area differently with respect to the rest of the mould 10.

It has thus been seen that the mould for the rotational moulding of plastic materials according to the present invention achieves the purposes outlined previously.

The mould for the rotational moulding of plastic materials of the present invention thus conceived in any case can undergo numerous modifications and variants, all of which are covered by the same inventive concept; moreover, all of the details can be replaced by technically equivalent elements. In practice, the materials used, as well as the shapes and sizes, can be whatever according to the technical requirements. The scope of protection of the invention is therefore defined by the attached claims.

The invention claimed is:

1. Mould (10) for the rotational moulding of manufactured articles of plastic material, the mould (10) comprising two half-moulds (12, 14) wherein at least one of said two half-moulds (12, 14) is provided, on its surface, with at least one insert-holding device (18) comprising a rod (20) provided with a first end (46) passing through the wall of the half-mould (12, 14) at a respective passage channel (24) and which is axially movable for projecting inside the mould (10), so that on said first end (46) an insert (22), to be embedded in the moulded manufactured article, can be mounted, the mould (10) further comprising a first pneumatic circuit (32A) able to apply a predetermined pressure, positive or negative, inside said mould (10), characterized in that said at least one insert-holding device (18) is operatively connected to a second pneumatic circuit (32B) able to apply a predetermined pressure, positive or negative, and it is internally provided with a plurality of means (34, 36, 38) configured for applying said predetermined pressure at said passage channel (24), said second pneumatic circuit (32B) being configured to apply, at said at least one insert-holding device (18), the same predetermined pressure value which generates inside the mould (10) by means of the first pneumatic circuit (32A).

2. Mould (10) according to claim 1, characterized in that said means (34, 36, 38) configured to apply said predetermined pressure at the passage channel (24) comprise:
   a fitting (34) for connecting with the second pneumatic circuit (32B);
   an inner duct system (36) fluidly connected with said fitting (34) and configured to blow compressed air and/or to generate vacuum at the passage channel (24); and
   one or more sealing elements (38) configured to hydraulically insulate said inner duct system (36).

3. Mould (10) according to claim 1, characterized in that the second pneumatic circuit (32B) supplying the insert-holding devices (18) is independent from the first pneumatic circuit (32A) that supplies the mould (10).

4. Mould (10) according to claim 1, characterized in that the second pneumatic circuit (32B) supplying the insert-holding devices (18) is made in series with the first pneumatic circuit (32A) that supplies the mould (10).

5. Mould (10) according to claim 1, characterized in that the insert-holding device (18) comprises an insert-holding bush (26) coaxially mounted outside the rod (20), said insert-holding bush (26) fixing the insert-holding device (18) on the outer wall of the respective half-mould (12, 14) in a removable manner.

6. Mould (10) according to claim 1, characterized in that the rod (20), along with the respective first end (46), is held inside the body of the insert-holding device (18) by means of an elastic element (28) present inside the body of said insert-holding device (18).

7. Mould (10) according to claim 6, characterized in that said elastic element (28) consists of a gasket manufactured from a temperature resistant elastomeric material, said gasket (28) being configured to operate both as a spring and as a sealing element.

8. Mould (10) according to claim 1, characterized in that the rod (20) is rotatable around own axis and is provided with a first threaded end (46) and with a second handling end (30), opposite said first threaded end (46), that projects outside the half-mould (12, 14) and that is actuatable for imparting an axial rotation of said rod (20) and thus for facilitating the screwing of an insert (22) on the opposite first end (46).

9. Mould (10) according to claim 1, characterized in that it comprises a temperature control system consisting of:
one or more heating elements (16) applied on the surface of at least one of the two half-moulds (12, 14) in at least one predefined area of the mould (10);
one or more measuring temperature devices or probes (44) applied in said predefined area of the mould (10);
an electric circuit configured to supply said one or more heating elements (16); and
a temperature control system configured to adjust the electric power supplied to said one or more heating elements (16) according to the temperature measured by said probes (44) at said one or more heating elements (16).

10. Mould (10) according to claim 9, characterized in that said passage channel (24) and/or the corresponding insert-holding device (18) are provided with one or more heating elements (16) for making a heating area that can be controlled in a different way with respect to said at least one predefined area in the mould (10).

11. Mould (10) according to claim 10, characterized in that the heating elements (16) applied to said passage channel (24) and/or to the corresponding insert-holding device (18) are selected from the group consisting of:
one or more heater bands;
one or more cartridge heaters; and
one or more flexible heaters wound around the insert-holding device (18).

12. Machine (100) for the rotational moulding comprising a base frame (102) supporting a first movable frame (104) that is rotatable around a first motorized axis (A), a second movable frame (106) that is rotatable around a second motorized axis (B), orthogonal to said first motorized axis (A), being supported inside said first movable frame (104), characterized in that on said second movable frame (106) a mould (10) is mounted according to claim 1.

13. Mould (10) for the rotational moulding of manufactured articles of plastic material, the mould (10) comprising two half-moulds (12, 14) wherein at least one of said two half-moulds (12, 14) is provided, on its surface, with at least one insert-holding device (18) comprising a rod (20) provided with a first end (46) passing through the wall of the half-mould (12, 14) at a respective passage channel (24) and which is axially movable for projecting inside the mould (10), so that on said first end (46) an insert (22), to be embedded in the moulded manufactured article, can be mounted, the mould (10) further comprising a first pneumatic circuit (32A) able to apply a predetermined pressure, positive or negative, inside said mould (10), characterized in that said at least one insert-holding device (18) is operatively connected to a second pneumatic circuit (32B) able to apply a predetermined pressure, positive or negative, and is configured for applying said predetermined pressure at said passage channel (24), said second pneumatic circuit (32B) being configured to apply, at said at least one insert-holding device (18), the same predetermined pressure value which generates inside the mould (10) by way of the first pneumatic circuit (32A).

* * * * *